United States Patent
Surti et al.

(10) Patent No.: US 10,185,819 B2
(45) Date of Patent: Jan. 22, 2019

(54) EXTENSION CONFIGURATION AND INTERACTION

(71) Applicant: Microsoft Technology Licensing, LLC, Redmond, WA (US)

(72) Inventors: Tanvi Saumil Surti, Seattle, WA (US); Chee Chen Tong, Kirkland, WA (US); Sean Obafemi Lyndersay, Sammamish, WA (US); Israel Hilerio, Kenmore, WA (US); John Anderson Hazen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/810,620

(22) Filed: Nov. 13, 2017

(65) Prior Publication Data

US 2018/0068109 A1 Mar. 8, 2018

Related U.S. Application Data

(63) Continuation of application No. 15/206,870, filed on Jul. 11, 2016, now Pat. No. 9,817,966, which is a continuation of application No. 14/619,776, filed on Feb. 11, 2015, now Pat. No. 9,389,928.

(51) Int. Cl.
*G06F 15/16* (2006.01)
*G06F 21/44* (2013.01)
*G06F 9/54* (2006.01)

(52) U.S. Cl.
CPC .............. *G06F 21/445* (2013.01); *G06F 9/54* (2013.01); *G06F 9/541* (2013.01)

(58) Field of Classification Search
CPC ................................................ H04L 29/08072

USPC ......................................................... 709/217
See application file for complete search history.

(56) References Cited

U.S. PATENT DOCUMENTS

| | | | |
|---|---|---|---|
| 7,685,561 B2 | 3/2010 | Deem et al. | |
| 8,099,472 B2 | 1/2012 | Mahaffey et al. | |
| 8,270,606 B2 | 9/2012 | Caskey et al. | |
| 8,650,320 B1 | 2/2014 | Merrick et al. | |
| 8,667,514 B2 | 3/2014 | Rastogi et al. | |
| 8,745,573 B2 | 6/2014 | Ben-Artzi et al. | |
| 8,881,179 B2 | 11/2014 | Labra et al. | |
| 9,003,431 B2 | 4/2015 | You et al. | |
| 9,389,928 B1 | 7/2016 | Surti et al. | |
| 9,658,866 B2 * | 5/2017 | Jorgensen | G06F 9/4445 |

(Continued)

OTHER PUBLICATIONS

"Building Cross Platform Applications Overview", Retrieved from <http://developer.xamarin.com/guides/cross-platform/application_fundamentals/building_cross_platform_applications/part_0_-_overview/>, Jul. 12, 2014, 3 pages.

(Continued)

*Primary Examiner* — Andy Ho

(57) ABSTRACT

Techniques for extension interaction with applications are described. Generally, an extension represents functionality for extending, modifying, customizing, and/or supplementing native functionality of an application. Techniques discussed herein provide a common extension platform that enables an extension to interact with multiple different applications utilizing components of the platform. The common extension platform, for instance, exposes a set of common extension application programming interfaces (APIs) that provide a common interaction surface between extensions and applications.

20 Claims, 10 Drawing Sheets

(56) References Cited

U.S. PATENT DOCUMENTS

| | | | |
|---|---|---|---|
| 9,817,966 | B2 | 11/2017 | Surti et al. |
| 2005/0243019 | A1 | 11/2005 | Fuller et al. |
| 2008/0155698 | A1 | 6/2008 | Round |
| 2008/0222238 | A1 | 9/2008 | Ivanov et al. |
| 2009/0077248 | A1 | 3/2009 | Castellucci et al. |
| 2010/0061534 | A1 | 3/2010 | Wang et al. |
| 2011/0035742 | A1 | 2/2011 | Shenfield |
| 2011/0319056 | A1 | 12/2011 | Toy et al. |
| 2012/0144407 | A1 | 6/2012 | Hacigumus et al. |
| 2012/0331488 | A1 | 12/2012 | Marathe et al. |
| 2013/0055285 | A1 | 2/2013 | Merry et al. |
| 2013/0086155 | A1 | 4/2013 | Thomas et al. |
| 2013/0125145 | A1 | 5/2013 | Balmori Labra et al. |
| 2013/0152070 | A1 | 6/2013 | Bhullar et al. |
| 2013/0152092 | A1 | 6/2013 | Yadgar |
| 2013/0152217 | A1 | 6/2013 | Park |
| 2013/0159377 | A1 | 6/2013 | Nash |
| 2013/0254139 | A1 | 9/2013 | Lei |
| 2013/0311997 | A1 | 11/2013 | Gruber et al. |
| 2014/0047359 | A1 | 2/2014 | Teigene et al. |
| 2014/0053126 | A1 | 2/2014 | Watson et al. |
| 2014/0082501 | A1 | 3/2014 | Bae et al. |
| 2014/0141875 | A1 | 5/2014 | Faria |
| 2014/0163976 | A1 | 6/2014 | Park et al. |
| 2014/0164400 | A1 | 6/2014 | Kruglick |
| 2014/0173448 | A1 | 6/2014 | Aly et al. |
| 2014/0240363 | A1 | 8/2014 | Hong |
| 2014/0331317 | A1 | 11/2014 | Singh |
| 2015/0281869 | A1 | 10/2015 | Ramachandran et al. |
| 2016/0012350 | A1 | 1/2016 | Narayanan et al. |
| 2016/0321449 | A1 | 11/2016 | Surti et al. |
| 2016/0335138 | A1 | 11/2016 | Surti et al. |
| 2017/0255494 | A1* | 9/2017 | Bartfai-Walcott .... G06F 9/5027 |

OTHER PUBLICATIONS

"Final Office Action", U.S. Appl. No. 14/712,364, dated Sep. 23, 2016, 24 pages.
"Final Office Action", U.S. Appl. No. 14/712,364, dated Oct. 19, 2017, 35 pages.
"Guile", Retrieved from <http://www.gnu.org/software/guile/> on Oct. 28, 2014, Feb. 22, 2012, 2 pages.
"Handling Common Scenarios", Retrieved from <https://developer.apple.com/library/ios/documentation/General/Conceptual/ExtensibilityPG/ExtensionScenarios.html> on Oct. 28, 2014, Sep. 17, 2014, 7 pages.
"How to Use Google Now on Dektop Pc Using Chrome", Available at: http://www.avoiderrors.net/google-now-desktop-pc/, Sep. 26, 2014, 3 pages.
"International Preliminary Report on Patentability", Application No. PCT/US2016/027653, dated Jun. 27, 2017, 10 pages.
"International Preliminary Report on Patentability", Application No. PCT/US2016/017044, dated May 18, 2017, 6 pages.
"International Search Report and Written Opinion", Application No. PCT/US2016/017044, dated Apr. 21, 2016, 11 pages.
"International Search Report and Written Opinion", Application No. PCT/US2016/027653, dated Jun. 22, 2016, 17 pages.
"Meet your new Personal Assistant: Speaktoit (Mobile App)", Retrieved on: Sep. 26, 2014—Available at: http://7labs.heypub.com/mobile/meet-your-new-personal-assistant-speaktoit-mobile-app.html, 6 pages.
"Message Passing", Retrieved from <https://developer.chrome.com/extensions/messaging> on Oct. 28, 2014, Feb. 28, 2014, 10 pages.
"Non-Final Office Action", U.S. Appl. No. 14/712,364, dated Mar. 17, 2016, 20 pages.
"Non-Final Office Action", U.S. Appl. No. 14/712,364, dated Mar. 24, 2017, 26 pages.
"Non-Final Office Action", U.S. Appl. No. 15/206,870, dated Mar. 24, 2017, 6 pages.
"Notice of Allowance", U.S. Appl. No. 14/619,776, dated Mar. 2, 2016, 8 pages.
"Notice of Allowance", U.S. Appl. No. 15/206,870, dated Jul. 14, 2017, 5 pages.
"Personal assistant Android app Friday learns your habits, makes recommendations", Available at: http://articles.courant.com/2012-08-11/business/hc-ls-android-friday-app-20120811_1_android-app-third-party-developers, Aug. 11, 2012, 2 pages.
"Second Written Opinion", Application No. PCT/US2016/017044, dated Feb. 6, 2017, 5 pages.
"Second Written Opinion", Application No. PCT/US2016/027653, dated Mar. 23, 2017, 9 pages.
"Sherpa Beta Personal Assistant", Available at: https://play.google.com/store/apps/details?id=com.sherpa.asistentesherpa&hl=en, Sep. 24, 2015, 3 pages.
Biancuzzo,"Hate Daily Chores? Get These Apps", Available at: http://www.wallstreetdaily.com/2014/06/19/instacart-postmates-apps/, Jun. 19, 2014, 10 pages.
Chambers,"Integrating Your Application into the Windows Phone Speech and Natural Language Experience", Retrieved from <<http://channel9.msdn.com/Events/Build/2014/2-530>>, Apr. 2, 2014, 64 pages.
Doran,"Cortana Extensibility in Universal Windows App", Retrieved from <<http://channel9.msdn.com/Events/Build/2015/2-691>>, Apr. 30, 2015, 42 pages.
Edwards,"Windows Phone 8.1 brings Cortana smart assistant to the world of Siri and Google Now", Available at; http://www.pocket-lint.com/news/128243-windows-phone-8-1-brings-cortana-smart-assistant-to-the-world-of-siri-and-google-now, Apr. 2, 2014, 8 pages.
Ethertington,"Apple Working on More Third-Party Integrations for Siri With iWatch In Mind, Report Claims", Available at: http://techcrunch.com/2014/03/05/apple-working-on-more-third-party-integrations-for-sid-with-iwatch-in-mind-report-claims/, Mar. 5, 2014, 4 pages.
Levy,"Siri's Inventors Are Building a Radical New AI That Does Anything You Ask", Available at: http://www.wired.com/2014/08/viv/, Aug. 12, 2014, 24 pages.
McCrasken,"EasilyDo 3.0: A Do-Everything Personal Assistant for Your Smartphone", Available at: http://techland.time.com/2014/02/13/easilydo-3-0-a-do-everything-personal-assistant-for-your-smartphone/, Feb. 13, 2014, 3 pages.
Milhorat,"Building the Next Generation of Personal Digital Assistants", In Proceedings of 1st International Conference on Advanced Technologies for Signal and Image Processing, Mar. 17, 2014, 8 pages.
Viticci,"iOS 8 Extensions: Apple's Plan for a Powerful App Ecosystem", Retrieved from <http://www.macstories.net/stories/ios-8-extensions-apples-plan-for-a-powerful-app-ecosystem/> on Oct. 28, 2014, Jun. 29, 2014, 21 pages.
"Advisory Action", U.S. Appl. No. 14/712,364, dated Feb. 12, 2018, 3 pages.
"Foreign Office Action", CO Application No. NC2017/0011488, dated Nov. 10, 2017, 4 pages.

* cited by examiner

EXTENSION CONFIGURATION AND INTERACTION

RELATED APPLICATIONS

This application is a continuation of and claims priority to U.S. patent application Ser. No. 15/206,870 entitled "Extension Interaction with Applications" and filed Jul. 11, 2016 which in turn is a continuation of and claims priority to U.S. patent application Ser. No. 14/619,776 entitled "Platform for Extension Interaction with Applications" and filed Feb. 11, 2015, now U.S. Pat. No. 9,389,928, the disclosures of which are incorporated by reference herein their entirety.

BACKGROUND

Computing devices typically leverage different applications and services (hereinafter "applications") to enable various tasks to be performed, such as productivity tasks, web browsing, content editing, and so forth. Further, applications generally include a default set of functionality for performing such tasks. It has been recognized, however, that default functionality of applications can be extended and/or customized to suit various usage scenarios. Accordingly, extensions have been developed that provide customization of default application functionality and/or behavior. Generally, extensions represent programs that modify or add functionality to an application and are not typically implemented independently of an application. Examples of extensions include ad blockers for web browsers, dictionaries for word processors, and translation capabilities for mobile applications.

Current ways for developing extensions typically require development of application-specific extensions to suit different applications and/or computing platforms. This increases the development burden on developers that wish to create common extension experiences that function across different applications and platforms but are currently limited to development of application-specific extensions. This is also cumbersome for users who might desire to use extension capabilities (e.g., dictionary-based extensions) across all applications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for extension interaction with applications are described. Generally, an extension represents functionality for extending, modifying, customizing, and/or supplementing native functionality of an application. Techniques discussed herein provide a common extension platform that enables an extension to interact with multiple different applications utilizing components of the platform. The common extension platform, for instance, exposes a set of common extension application programming interfaces (APIs) that provide a common interaction surface between extensions and applications.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
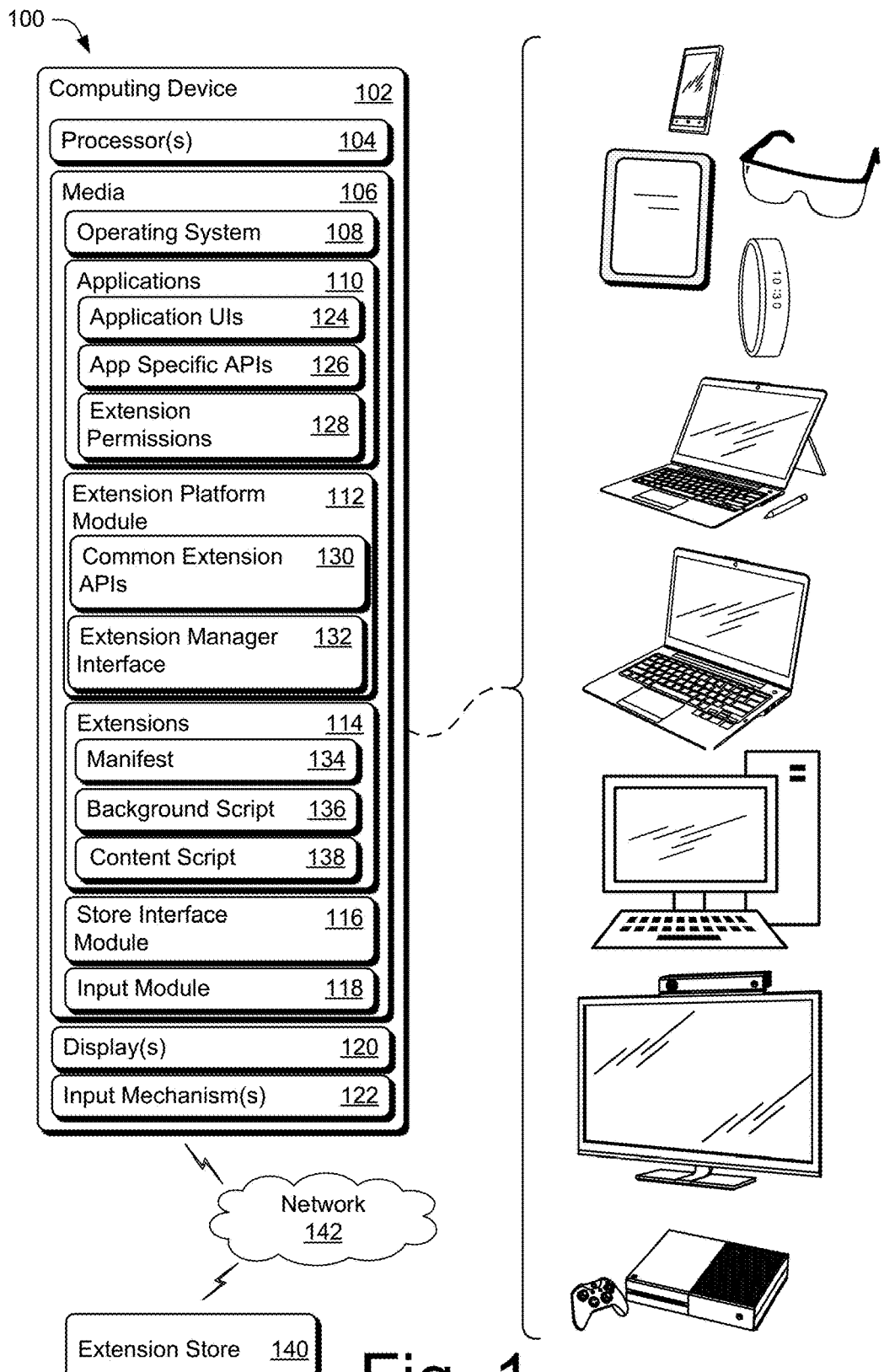
FIG. 1 is an illustration of an environment in an example implementation that is operable to employ techniques discussed herein in accordance with one or more embodiments.

Techniques described herein provide for extension interaction with applications. Generally, an extension represents functionality for extending, modifying, customizing, and/or supplementing native functionality of an application. According to various implementations, an extension may be implemented as a plug-in, an add-in, an add-on, and so forth. Techniques discussed herein provide a common extension platform that enables an extension to interact with multiple different applications utilizing components of the platform. The common extension platform, for instance, exposes a set of common application programming interfaces (APIs) that provide a common interaction surface between extensions and applications. For example, an extension may call a particular common extension API to interact with multiple different autonomous applications, such as to functionally reconfigure (e.g., "extend") the applications.

Accordingly, programming and computing resources are conserved by enabling an individual API to be utilized across multiple different applications such that different APIs are not required to be written, stored, and called on a per-application basis.

Implementations discussed herein enable a common entry point for invoking an extension to be provided across multiple different applications. Examples of a common entry point include a common extension icon, a common gesture, a common key combination, and so forth. Thus, user interaction required to invoke an extension across different applications is simplified and a number of user interactions required to invoke an extension is reduced.

Implementations discussed herein support various extension permissions for specifying parameters for interaction between extensions and applications. Extension permissions, for instance, indicate allowed and/or disallowed interactions between an extension and an application. In at least some implementations, extension permissions are specified on a per-application and/or per-extension basis.

Implementations discussed herein enable communication of information among different instances of an extension. For instance, different instances of a particular extension are bound to different respective applications. Information may be exchanged among the different instances of the extension, such as state information for their respective applications. Implementations cause various actions to be performed in response to the exchange of information, such as functional reconfiguration of an application in response to state information regarding another application.

Implementations discussed herein provide an extension manager settings graphical user interface (GUI) that enables various extension-related tasks to be performed. Examples of such tasks include disabling, enabling, and customizing installed extensions.

The extension manager GUI also enables new extensions to be obtained, such as by providing an interface to a remote extension store. Thus, user interactions required to obtain and manage extensions are reduced by providing a single integrated functionality for performing extension-related tasks. Alternatively or additionally, an extension store interface for obtaining additional extensions may be presented separately from the extension manager GUI.

In the following discussion, an example environment is first described that is operable to employ techniques described herein. Next, a section entitled "Example Implementation Scenarios" describes some example scenarios for extension interaction with applications in accordance with one or more embodiments. Next, a section entitled "Example Procedures" describes some example procedures for extension interaction with applications in accordance with one or more embodiments. Finally, a section entitled "Example System and Device" describes an example system and device that are operable to employ techniques discussed herein in accordance with one or more embodiments.

Example Environment

FIG. 1 illustrates an example environment 100 in which techniques enabling extension interaction with applications can be embodied. Environment 100 includes a computing device 102, which may be implemented in various ways. The computing device 102, for instance, may be configured as a traditional computer (e.g., a desktop personal computer, laptop computer, and so on), a mobile station, an entertainment appliance, a wireless phone, a tablet, a netbook, a wearable device, and so forth as further described in relation to FIG. 13.

Thus, the computing device 102 may range from full resource devices with substantial memory and processor resources (e.g., personal computers, game consoles) to a low-resource device with limited memory and/or processing resources, such as traditional set-top boxes, hand-held game consoles, wearable devices, smart appliances (e.g., "Internet of Things" (IoT) devices), and so forth. The computing device 102 also relates to software that causes the computing device 102 to perform various operations.

Computing device 102 includes computer processor(s) 104 and computer-readable storage media 106 (media 106). Media 106 includes an operating system 108, applications 110, an extension platform module 112, extensions 114, a store interface module 116, and an input module 118.

Computing device 102 also includes or has access to one or more displays 120 and input mechanisms 122. The displays 120 are generally representative of hardware and logic for visual output. The input mechanisms 122 may include gesture-sensitive sensors and devices, such as touch-based sensors and movement-tracking sensors (e.g., camera-based), as well as mice (free-standing or integral with a keyboard), a stylus, touch pads, accelerometers, and microphones with accompanying voice recognition software, to name a few. The input mechanisms 122 may be separate or integral with displays 120; integral examples include gesture-sensitive displays with integrated touch-sensitive or motion-sensitive sensors.

The operating system 108 manages resources of computing device 102 and may be implemented using any suitable instruction format. Operating system 108 enables functionalities of computing device 102 to access hardware and logic resources of computing device 102.

The applications 110 include any suitable type of application and/or service, such as productivity applications, web browsers, media viewers, navigation applications, multimedia editing applications, and so forth. According to various implementations, the applications 110 may be implemented as locally-installed code that is executed as part of a local runtime environment. Additionally or alternatively, the applications 110 represent portals to distributed functionality, such as web services, cloud services, distributed enterprise services, and so forth. According to various implementations, the individual applications 110 represent autonomous applications that are executable independently of one another.

Individual applications 110 include one or more application user interfaces (UIs) 124, which enable viewing and/or interaction with content of an application. The application UIs 124 include predefined properties or preferences (e.g., default values or settings) for presenting an application 110, such as an aspect ratio, maximum size, minimum size, position, primacy, display orientation, and so forth.

The applications 110 further include and/or are associated with application ("App") specific APIs 126 and extension permissions 128. Generally, the app specific APIs 126 enable access to content, properties, functionalities, and/or settings of the applications 110 and/or respective application UIs 124. In at least some implementations, different instances of the applications 110 include or are associated with different instances and/or sets of the app specific APIs 126. As further detailed below, the extensions 114 may leverage the app specific APIs 126 to interact with the applications 110.

According to various implementations, the extension permissions 128 specify various parameters for interaction between the extensions 114 and the applications 110. For instance, the extension permissions 128 specify specific interactions and behaviors that are permitted and/or not permitted between an extension 114 and an application 110. The extension permissions 128 may also specify particular types and instances of extensions 114 that are permitted and/or not permitted to interact with particular applications 110. In at least some implementations, individual applications 110 are associated with different extension permissions 128. Examples of different extension permissions 128 are detailed below.

The extension platform module 112 is representative of functionality to provide a common extension platform across the applications 110, as well as other applications and services not specifically identified herein. For instance, the extension platform module 112 represents logic for performing various attributes of techniques for extension interaction with applications discussed herein.

The extension platform module 112 includes and/or has access to common extension APIs 130 and an extension manager interface 132. The common extension APIs 130 are representative of APIs that may be leveraged by the extensions 114 to interact with the applications 110. For instance, the common extension APIs 130 enable the extensions 114 to interact with visual and/or functional aspects of the applications 110, such as to augment and/or customize the application UIs 124, to receive state information from the applications 110, and so forth. According to various implementations, the common extension APIs 130 are not specific to a particular application 110 or extension 114, and may be leveraged by the different extensions 114 to interact with different applications 110. For instance, a particular common extension API 130 enables a common behavior to be applied among different applications 110.

The extension manager interface 132 is representative of functionality to enable different aspects and attributes of the extensions 114 to be configured. For instance, the extension manager interface 132 enables extensions 114 to be enabled, disabled, customized, and so forth. In at least some implementations, the extension manager interface 132 enables users to customize various settings of the extensions 114. The extension manager interface 132, for instance, is configured to present a graphical user interface (GUI) that enables users to view state information for the extensions 114 and to configure various attributes of the extensions 114.

The extensions 114 are representative of functionalities for extending and customizing various attributes and behaviors of the applications 110. For instance, an extension 114 may interact with an application 110 provide additional functionality on top of native functionality enabled by the application 110. As another example, an extension 114 may extend and/or customize existing native functionality of an application 110. In at least some implementations, the extensions 114 represent "plug-ins" that interface with the applications 110 in various ways. According to various implementations, different instances of the extensions 114 represent different respective functionalities and thus provide different respective behaviors, functionalities, customizations, and so forth.

The extensions 114 each include respective instances of a manifest 134, a background script 136, and a content script 138. The manifest 134 includes descriptive information about an extension 114, such as biographical information, an extension logo, an extension icon, and so forth. In at least some implementations, the manifest 134 is implemented as a declarative file whereby an extension 114 defines itself.

According to various implementations the manifest 134 includes permissions that a respective extension 114 utilizes to interact with the applications 110. For instance, different manifests 134 may specify different types and instances of permissions that specify allowed and disallowed interactions with applications 110 and/or specific instances of the applications 110. A manifest 134, for example, may specify types of content that an extension may access from an application 110 and/or other functionality of the computing device 102. The manifest 134 may also specify particular applications 110 that an extension 114 is permitted to interact with, and/or particular applications 110 that an extension 114 is not permitted to interact with. The manifest 134 may be implemented in various ways, such as an Extensible Markup Language (XML) file, a JavaScript Object Notation (JSON) file, and so forth.

The background script 136 is representative of logic that is at the core of the extensions 114 and that enables functionality of the respective extensions 114. The background script 136, for instance, enables the extensions 114 to listen for events, respond to events, call APIs (e.g., the app specific APIs 126, the common extension APIs 130, and so forth), and generally execute logic of the extensions 114. In at least some implementations, the background script 136 is implemented as a JavaScript file.

According to various implementations, the background script 136 may be common across different instances of the extensions 114 and the applications 110. Alternatively or additionally, different instances of the extensions 114 may include different implementations of the background script 136. In at least some implementations, a background script 136 runs persistently as a background process that listens and responds to various events. Alternatively or additionally, a background may hibernate and be awakened in response to various events and/or based on a pre-defined set of rules.

The content script 138 is representative of logic that runs in the context of the applications 110 and that enables the extensions 114 to interact with the applications 110 in various ways. For instance, the content script 138 enables the extensions 114 to inject visuals into the application UIs 124, to extract information from the applications 110, to customize and/or extend functionalities of the applications 110, and so forth. For example, in the context of a web browser instance of the applications 110, the content script 138 includes executable script that is injected into the web browser UI and that runs concurrently with web pages displayed in the web browser UI. Further aspects and attributes of the extensions 114 and their various components are detailed below. In at least some implementations, the content script 138 is implemented as a JavaScript file.

Generally, the manifest 134, the background script 136, and the content script 138 represent a common scripting model that is employed by the different extensions 114 to enable various interactions by the extensions 114 with the applications 110. For instance, the configuration of the manifest 134, the background script 136, and the content script 138 will vary among the different extensions 114, but their general architecture remains consistent such that interaction with the different applications 110 (e.g., via the common extension APIs 130) is enabled.

The store interface module 116 is representative of functionality to interact with an extension store 140 over a network 142. The extension store 140, for instance, represents a network-accessible resource that can be leveraged by users to obtain extensions 114 for the computing device 102, updates for the extensions 114, and so forth. In at least some implementations, the store interface module 116 presents a GUI interface to the extension store 140 such that a user may view and select extensions to be downloaded from the extension store 140 to the computing device 102.

The network 142 may be implemented in various ways, such as a wired network, a wireless network, and combinations thereof. The input module 118 is representative of functionality to enable the computing device 102 to receive input (e.g., via the input mechanisms 122) and to process and route the input in various ways.

Having discussed an example environment in which techniques for extension interaction with applications may be employed, consider now some example implementation scenarios in accordance with one or more implementations.

Example Implementation Scenarios

This section describes some example implementation scenarios for extension interaction with applications in accordance with one or more implementations. Generally, the implementations scenarios are described as being implemented in the environment 100, but may be implemented in any suitable environment.

Figure 2:
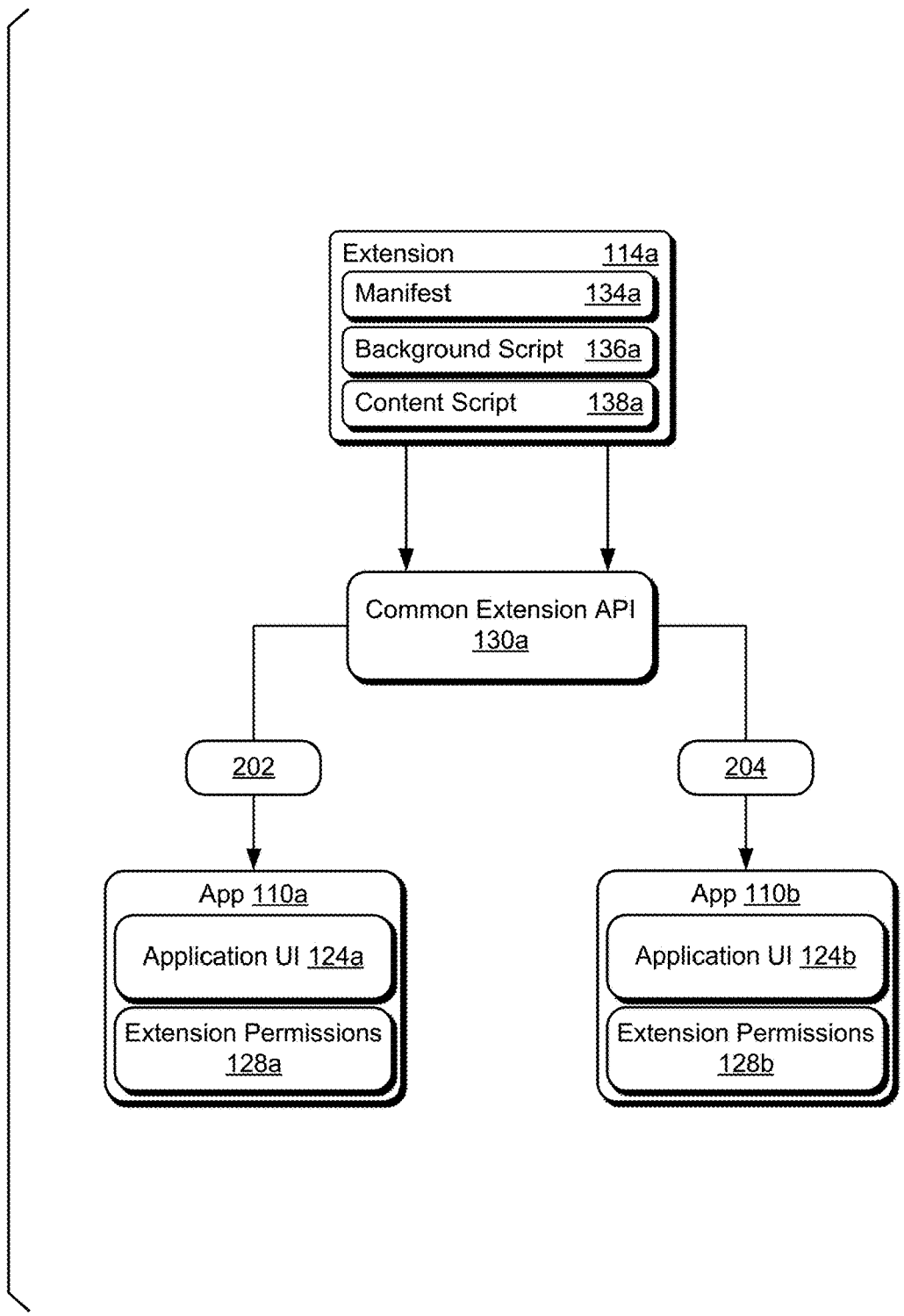
FIG. 2 depicts an example implementation scenario for enabling interaction between an extension and multiple applications via a common extension application programming interface in accordance with one or more embodiments.

FIG. 2 depicts an example implementation scenario 200 for enabling interaction between an extension and multiple applications via a common extension API in accordance with one or more implementations. The scenario 200 includes an extension 114a with a manifest 134a, a background script 136a, and a content script 138a. According to various implementations, the extension 114a represents an instance of the extensions 114 introduced above.

The scenario 200 further includes an application 110a with an application UI 124a and extension permissions 128a, and an application 110b with an application UI 124b and extension permissions 128b. According to various implementations, the applications 110a, 110b represent different instances of the applications 110 introduced above.

Generally, the applications 110a, 110b represent different autonomous applications that operate independently of each other and that provide different respective sets of functionality. For purpose of example, consider that the application 110a represents a productivity application such as a word processor, a spreadsheet application, a database management application, and so forth. Consider further that the application 110b represents a content consumption application, such as a web browser, a media viewer, an entertainment portal, and so forth.

Further to the scenario 200, the extension 114a interacts with the applications 110a, 110b via a common extension API 130a. Generally, the common extension API 130a represents an instance of the common extension APIs, introduced above.

The extension 114a, for instance, engages in an interaction 202 with the application 110a via the common extension API 130a. Generally, the common extension API 130a provides an API surface that enables data to be exchanged between the extension 114a and the application 110a as part of the interaction 202.

According to various implementations, the interaction 202 is initiated based on an event processed by the background script 136a. For instance, the application 110a generates an event that is detected by the background script 136a to cause the interaction 202 to be initiated. The event may be generated in various ways, such as in response to user input, based on an occurrence of a particular application state, and so forth.

Further to the scenario 200, parameters of the interaction 202 are controlled by the extension permissions 128a. For instance, the extension permissions 128a specify types of interactions that are allowed and/or not allowed as part of the interaction 202. The extension permissions 128a, for example, may specify that the extension 114a is permitted to obtain data from the application UI 124a, such as part of a search functionality performed by the extension 114a. The extension permissions 128a may further specify, however, that the extension 114a is not permitted to alter certain native functionality of the application 110a, such as altering visual aspects of the application UI 124a. Thus, the extension permissions 128a include a specific set of parameters and/or conditions that dictate how the extension 114a is permitted to interact with the application 110a.

According to various implementations, the extension permissions 128a are generally applicable to interactions by any extension with the application 110a. For instance, the extension permissions 128a are not specific to any particular extension but are applied across all extension interactions with the application 110a. Alternatively or additionally, at least some of the extension permissions 128a are specific to particular instances of extensions and thus are applied to a particular extension but not to other extensions.

Generally, the interaction 202 may involve one or more different types of interactions, such as a data injection by the extension 114a into the application 110a, a data extraction by the extension 114a from the application 110a, and so forth. The content script 138a generally represents logic for implementing the interaction 202 with the application 110a.

Continuing with the scenario 200, the extension 114a engages in an interaction 204 with the application 110b via the common extension API 130a. As with the application 110a, the common extension API 130a provides an API surface that enables data exchange between the extension 114a and the application 110b. Further, initiation of the interaction 204 is implemented by the content script 138a and based on a particular event related to the application 110b.

According to various implementations, parameters of the interaction 204 are determined based on the extension permissions 128b. For instance, the extension permissions 128b specify various interactions between the extension 114a and the application 110b that are allowed and/or not allowed.

Generally, the interaction 204 includes one or more different types of interactions, such as a communication of data from the application 110b to the extension 114a, and/or vice-versa. Similarly to the interaction 202, the interaction 204 with the application 110b is implemented via logic of the content script 138a.

In at least some implementations, the interactions 202, 204 occur concurrently. For example, the extension 114a may interact with the applications 110a, 110b concurrently. Alternatively or additionally, the interactions 202, 204 represent interactions that occur at different respective times. Further, the interactions 202, 204 enable a common behavior to be applied by the extension 114a to the applications 110a, 110b by calling the common extension API 130a.

Although the scenario 200 is illustrated utilizing two different applications, it is to be appreciated that an instance of a common extension API 130 can be leveraged by extensions to interact with numerous different applications.

Accordingly, the scenario 200 demonstrates that techniques for extension interaction with applications may be employed to provide a common extension interaction platform (e.g., API surface) such that extensions may interact with a variety of different applications via a single integrated extension platform.

Figure 3:
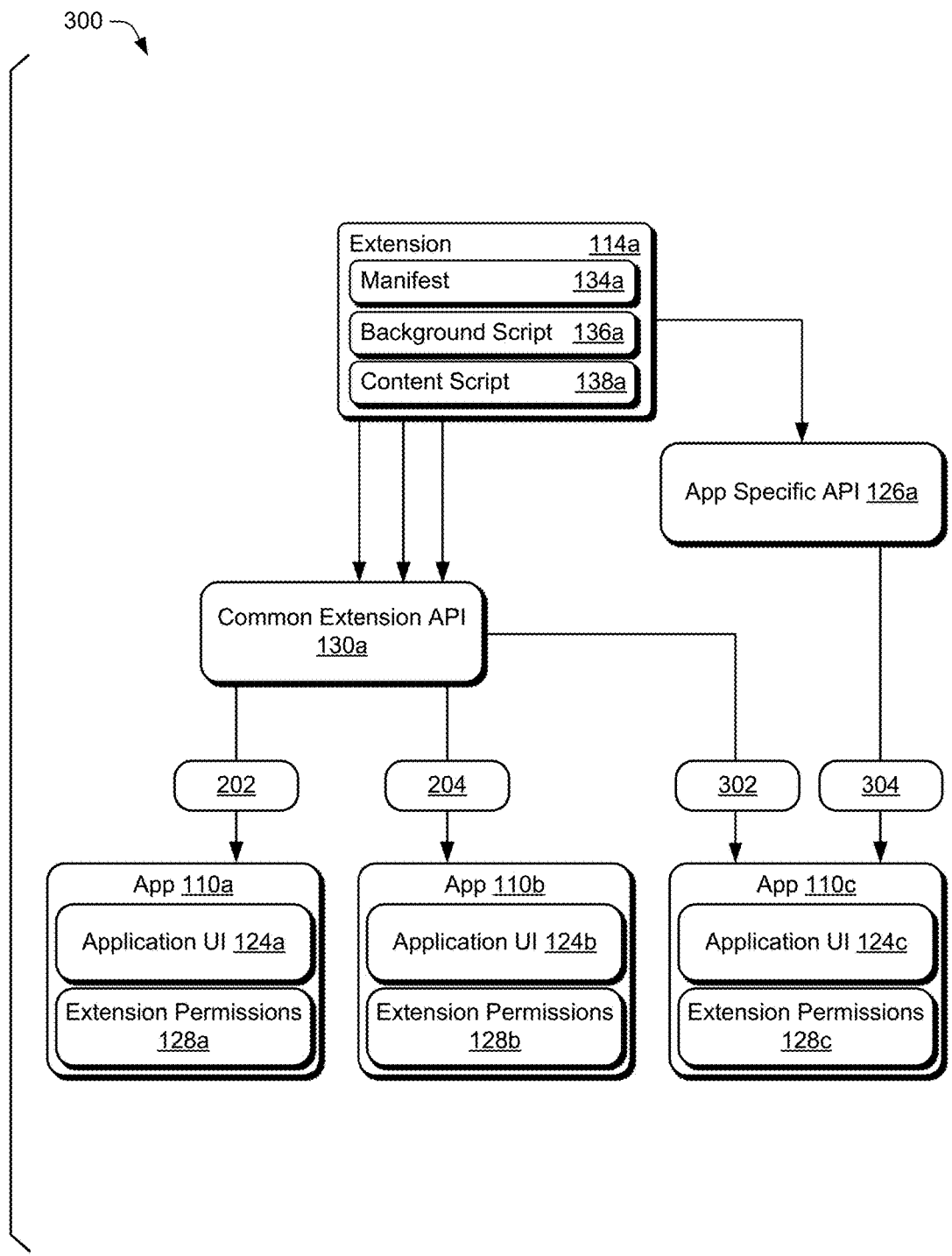
FIG. 3 depicts an example implementation scenario for enabling interaction between an extension and multiple applications via a common extension application programming interface and an application-specific application programming interface in accordance with one or more embodiments.

FIG. 3 depicts an example implementation scenario 300 for enabling interaction between an extension and multiple applications via a common extension API and an application-specific API in accordance with one or more implementations. In at least some implementations, the scenario 300 represents an extension and/or variation of the scenario 200, described above.

The scenario 300 depicts the extension 114a leveraging the common extension API 130a to interact with the application 110a via the interaction 202, and to interact with the application 110b via the interaction 204. Example aspects and attributes of the interactions 202, 204 are detailed above.

The scenario 300 further depicts the extension 114a engaging in an interaction 302 with an application 110c via the common extension API 130a. Generally, the application 110c represents an instance of the applications 110. According to various implementations, the common extension API 130a enables the extension 114a to engage in a common type of interaction with the applications 110a, 110b, 110c. For instance, the common extension API 130a enables a common type of data to be injected into the different applications, a common type of data to be extracted from the different applications, and so forth.

The scenario 300 further depicts the extension 114a engaging in an interaction 304 with the application 110c via an app specific API 126a. Generally, the app specific API 126c represents an instance of the app specific APIs 126.

According to various implementations, the app specific API 126a is specific to the application 110c. For instance, the app specific API 126a enables access to functionality of the application 110c that is not applicable to other applications 110. Consider, for example, an implementation where the application 110c is a web browser. In this example, the app specific API 126a enables interaction with an address bar and/or active uniform resource locator (URL) of the web browser application UI 124c. Such an interaction is typically not relevant and/or applicable to other applications that do not include an address bar and/or that do not display URL information.

Generally, parameters of the interactions 302, 304 are determined based on the extension permissions 128c. Examples of different aspects and attributes of the extension permissions 128c are detailed with regard to other instances of extension permissions discussed elsewhere herein.

In at least some implementations, the interactions 202, 204, 302, 304 occur simultaneously, e.g., during a concurrent period of time. Alternatively, the interactions represent interactions that occur at different periods of time.

Accordingly, the scenario 300 demonstrates that techniques for extension interaction with applications support providing a common API surface for some application interactions, and application specific API surfaces for other application interactions. The scenario 300 further demonstrates that extensions may engage in some interactions with a particular application utilizing a common API surface, and may engage in other interactions with the particular application utilizing an application specific API surface.

Figure 4:
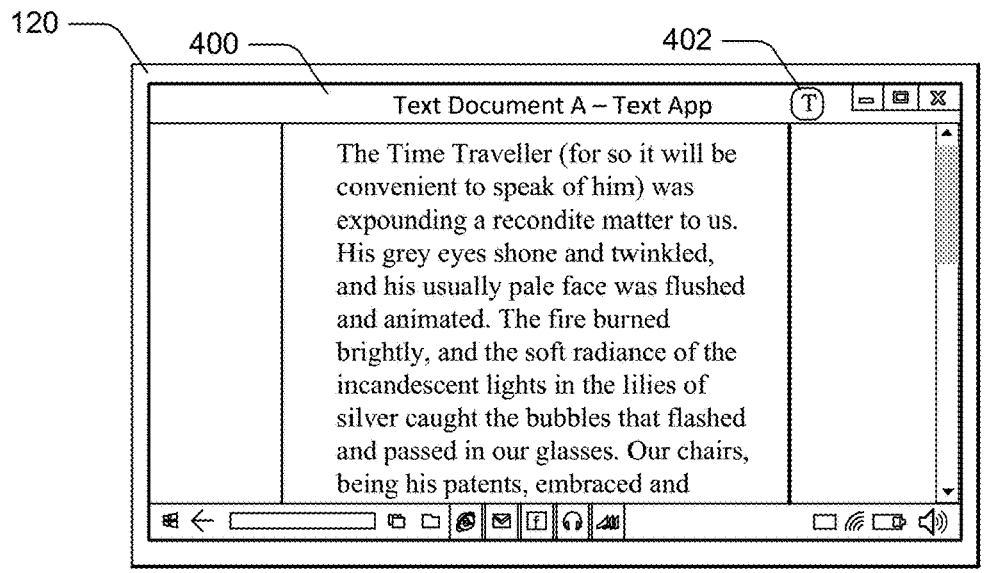
FIG. 4 illustrates an example application graphical user interface in accordance with one or more embodiments.

FIG. 4 illustrates an example application GUI 400 displayed on the display 120 in accordance with one or more implementations. Consider, for example, that the GUI 400 represents an implementation of the application UI 124a for the application 110a, introduced above.

Included as part of the GUI 400 is an extension icon 402, which is a visual representation of an extension that is invocable to interact with the application 110a. For purpose of example, consider that the extension icon 402 represents the extension 114a, introduced above. According to various implementations, the extension icon 402 is displayable to indicate that the extension 114a is currently interacting with the application 110a, and/or that the extension 114a is available to interact with the application 110a. For instance, the extension icon 402 is displayed in response to occurrence of one or more of the interactions described above. The extension icon 402, for example, is displayed when the extension 114a is actively interacting with the application 110a, and is removed from the GUI 400 when the extension 114a is not actively interacting with the application 110a.

Alternatively, the extension icon 402 is persistently displayed in the GUI 400 while the application 110a is running, e.g., whether or not the extension 114a is actively interacting with the application 110a. In such a scenario, a visual appearance of the extension icon 402 may depend on whether the extension 114a is interacting with the application 110a. For instance, when the extension 114a is not actively interacting with the application 110a, the extension icon 402 is visually deemphasized, e.g., is greyed-out. When the extension 114a begins actively interacting with the application 110a, the extension icon 402 is visually emphasized. For instance, the extension icon 402 is colorized, animated, and generally changed in appearance and/or behavior from when the extension 114a is not actively interacting with the application 110a.

According to one or more implementations, the extension icon 402 is user selectable to invoke the extension 114a. For instance, a user selection of the extension icon 402 causes the extension 114a to begin interacting with the application 110a. Consider an example where the extension 114a is a search-related extension. In such an example, a user selects text displayed on the GUI 400 and then selects the extension icon 402. In response, the extension 114a retrieves the selected text and initiates a search (e.g., a web search) using the text as a search term. According to various implementations, results of the search may be displayed in a region of the GUI 400, and/or may be displayed in a separate GUI.

In another example, the extension 114a is a translation extension, such as for translating a word or phrase from one language to another language. In such an example, a user selects text displayed on the GUI 400 and then selects the extension icon 402. In response, the extension 114a retrieves the selected text and initiates a translation of the selected text. According to various implementations, results of the translation may be displayed in a region of the GUI 400, and/or may be displayed in a separate GUI.

Figure 5:
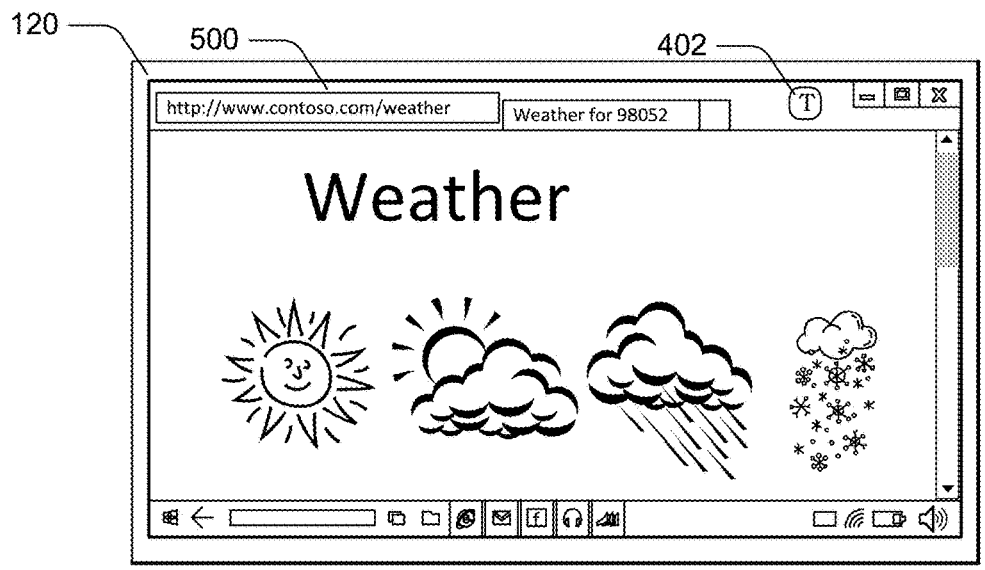
FIG. 5 illustrates an example application graphical user interface in accordance with one or more embodiments.

FIG. 5 illustrates an example application GUI 500 displayed on the display 120 in accordance with one or more implementations. Consider, for example, that the GUI 500 represents an implementation of the application UI 124b for the application 110b, introduced above.

Included as part of the GUI 500 is the extension icon 402, attributes of which are detailed above. For instance, example attributes of the extension icon 402 discussed above with reference to application 110a and the GUI 400, are equally applicable to the application 110b and the GUI 500.

Notice that in FIGS. 4 and 5, the extension icon 402 is displayed in the same general region of the different GUIs. For instance, the extension icon 402 is displayed in a common GUI region across different GUIs for different applications. Thus, according to various implementations, common extension entry points are provided across a variety of different autonomous applications.

In at least some implementations, the GUIs 400, 500 represent GUIs that are displayed as part of the scenarios 200 and/or 300 discussed above. For instance, the various interactions between the extension 114a and the respective applications are initiated in response to user selection of the extension icon 402. Alternatively or additionally, the extension icon 402 is displayed and/or visually reconfigured to reflect interaction between the extension 114a and the respective applications.

According to various implementations, the visual content and layout of the extension icon 402 is based on the manifest 134a. For instance, the manifest 134a specifies a particular logo and/or other visual element used to generate the extension icon 402. Further, behaviors of the extension icon 402 are implemented by the content script 138a. Execution of the content script 138a, for example, causes the extension icon 402 to be displayed and/or visually configured, and specifies respective regions of the GUIs 400, 500 in which the extension icon 402 is to be displayed.

Thus, the extension icon 402 represents a common entry point for invoking an extension that applies across multiple different applications and application GUIs. While these scenarios are discussed with reference to a visual icon as an extension entry point, it is to be appreciated that a variety of other common entry points may be employed, such as a common gesture, a common voice command, a common key combination, and so forth.

Figure 6:
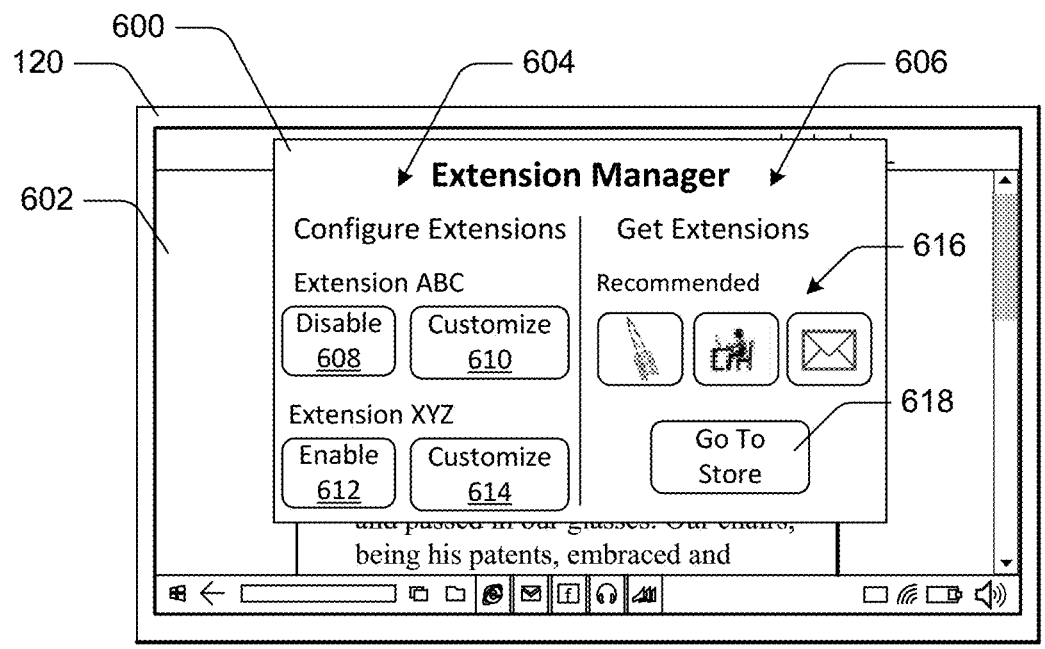
FIG. 6 illustrates an example extension manager graphical user interface in accordance with one or more embodiments.

FIG. 6 illustrates an example extension manager GUI 600 in accordance with one or more implementations. The extension manager GUI 600, for instance, is presented by the extension manager interface 132. In this particular example, the manager GUI 600 is displayed on the display 120 on top of an application UI 602. The application UI 602, for example, represents an implementation of an application UI 124 for an application 110, such as one of the GUIs 400, 500 discussed above.

According to various implementations, the manager GUI 600 is invoked by one or more actions and/or events. For instance, a user selects an extension manager icon displayed on the display 120 to invoke the manager GUI 600. As another example, a particular gesture invokes the GUI 600, such as a user swiping their finger across the display 120 from a particular edge and/or according to a particular gesture. Generally, ways in which the manager GUI 600 is invoked are common across multiple different applications.

According to various implementations, the manager GUI 600 enables existing extensions to be configured, and enables new extensions to be obtained. For instance, the manager GUI 600 includes a configure extensions ("configure") region 604 and a get extensions ("get") region 606.

The configure region 604 identifies different extensions that are currently installed and/or deployed, i.e., existing extensions. The configure region 604 further provides options for managing existing extensions. For an existing Extension ABC, for example, a disable control 608 and a customize control 610 are presented. Selection of the disable control 608 causes the Extension ABC to be disabled such that the Extension ABC is inactivated. Selection of the customize control 610 causes a further GUI and/or controls to be presented that enables attributes of the Extension ABC to be customized. For instance, selection of the customize control 610 causes further controls to be presented that enable permissions and/or allowed activities of the Extension ABC to be specified via user input.

For an existing Extension XYZ, an enable control 612 and a configure control 614 are presented. The Extension XYZ, for example, is installed but is currently disabled. Thus, selection of the enable control 612 causes the Extension XYZ to be enabled, e.g., activated. Selection of the configure control 614 enables attributes of the Extension XYZ to be configured, such as discussed above with reference to the Extension ABC.

The get region 606 identifies recommended extensions 616 that are not currently installed but are available to be installed. The recommended extensions 616 may be presented based on various criteria, such as most popular extensions, extensions that match user preferences and/or behaviors, highest rated extensions, and so forth. Generally, selection of a recommended extension initiates an installation process for activating a recommended extension. Once a recommended extension is installed, it will be presented in the configure region 604 such that various attributes of the recommended extension are configurable.

The get region 606 further includes a store control 618 that is selectable to navigate to a resource from which additional extensions may be obtained. For instance, selection of the store control 618 causes store functionality to be populated to the get region 606, such as for searching, obtaining, and purchasing extensions. Alternatively or additionally, selection of the store control 618 causes a separate store GUI to be presented from which extensions may be searched and downloaded. The store GUI, for instance, is presented by the store interface module 116 and represents a portal to the extension store 140.

As referenced above, a way of invoking the manager GUI 600 is common across various applications. Further, extensions presented in the configure region 604 and/or the get region 606 may depend on which application is currently in focus. The application GUI 602, for example, corresponds to an application that is currently in-focus on the display 120. For instance, existing extensions that are configured and/or permitted to interact with an in-focus application are presented in the configure region 604, but extensions that are not configured and/or not permitted to interact with an in-focus application are excluded from the configure region 604.

Still further, the get region 606 displays recommended extensions that are configured and/or permitted to interact with an in-focus application, and excludes extensions that are not configured and/or not permitted to interact with an in-focus application. Thus, common techniques for invoking the manager GUI 600 are provided, and extensions displayed and/or offered in the manager GUI 600 are filtered based on an application that is currently in-focus.

While the manager GUI 600 is illustrated as providing functionality for obtaining new extensions, it is to be appreciated that in at least some implementations, the get region 606 may be populated to a separate independent interface. For instance, a standalone GUI may be presented that provides an interface to the extension store 140 for obtaining additional extensions.

Figure 7:
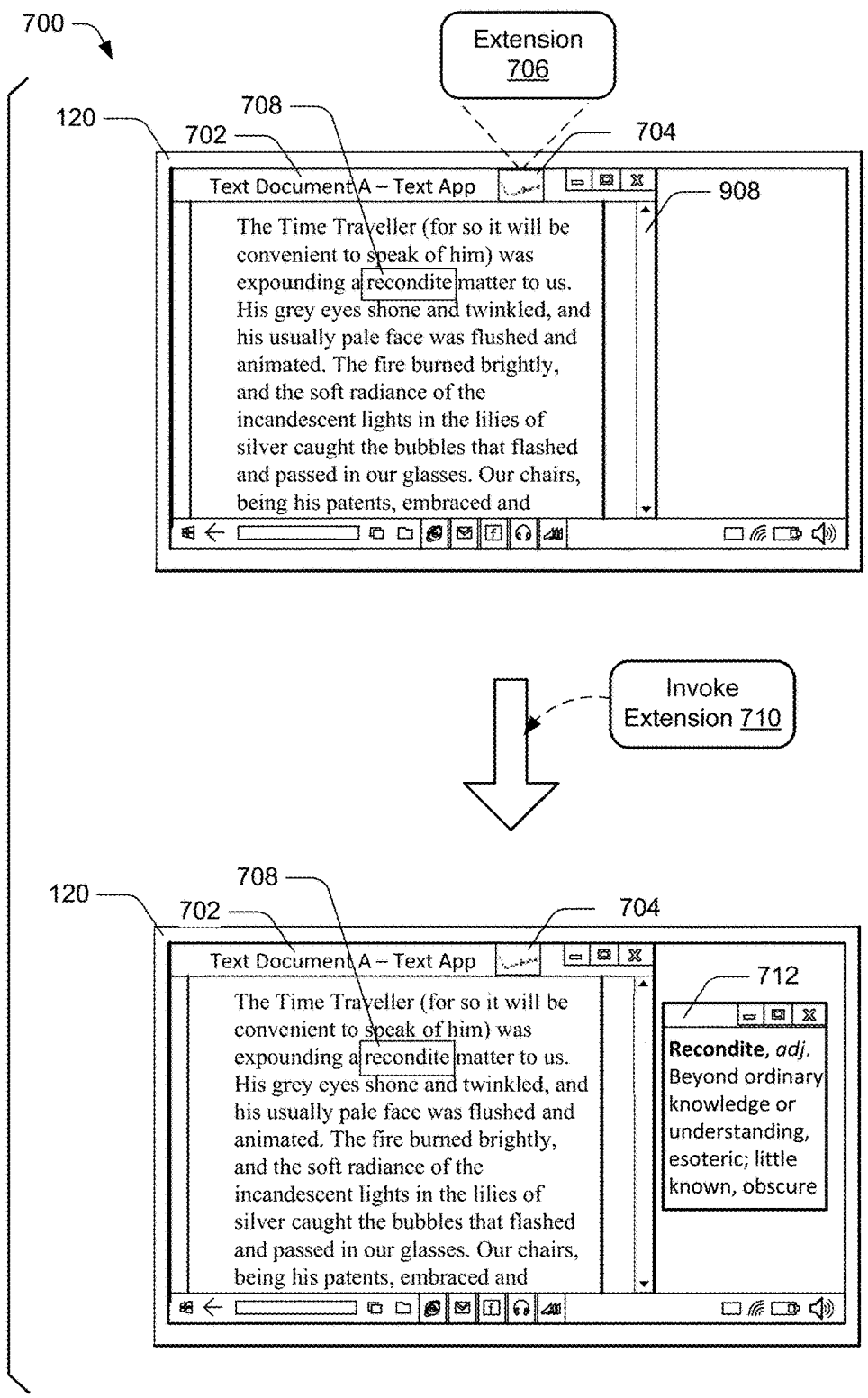
FIG. 7 depicts an example implementation scenario for presenting an extension graphical user interface separately from an application graphical user interface in accordance with one or more embodiments.

FIG. 7 depicts an example implementation scenario 700 for presenting an extension GUI separately from an application GUI in accordance with one or more implementations.

The upper portion of the scenario 700 includes an application GUI 702 displayed on the display 120, which generally represents an instance of the application UIs 124. The application GUI 702, for instance, represents one of the application UIs discussed with reference to FIGS. 3-6.

The application GUI 702 includes an extension icon 704, which generally represents an implementation of the extension icon 402 introduced above. Thus, aspects and attributes of the extension icon 402 apply to the extension icon 704.

The extension icon 704 represents an extension 706, which represents an instance of the extensions 114.

Further to the scenario 700, a user performs a text selection 708 to select a term displayed on the application GUI 702. The user then selects the extension icon 704 to invoke extension 706. In this particular example, the extension 706 is a dictionary extension that is configured to define terms. This is not intended to be limiting, however, and the extension 706 may represent an instance of a variety of different extensions that provide a variety of different functionalities.

Proceeding to the lower portion of the scenario 700, an extension invoke event 710 occurs which causes the extension 706 to be invoked. Accordingly, the extension 706 searches for a definition for the text selection 708 and presents the definition in an extension GUI 712. The extension GUI 712, for instance, represents a GUI that is presented and managed by the extension 706.

As illustrated in the scenario 700, the extension GUI 712 is presented separately from the application GUI 702. For instance, extension permissions 128 for an application represented by the application GUI 702 specify that the extension 706 (along with other extensions, optionally) are not permitted to inject content into the application GUI 702. The extension permissions do, however, specify that the extension 706 may extract data from the application GUI 702, such as selected text. Thus, based on the extension permissions, the extension 706 extracts the text selection 708 from the application GUI 702, obtains a definition for the text selection (e.g., via a web resource), and generates its own respective extension GUI 712 that is populated with the definition. Thus, implementations for extension interaction with applications discussed herein enable extensions to provide their own separate output experience to provide extension functionality that complies with different levels of extension permissions across different applications.

Figure 8:
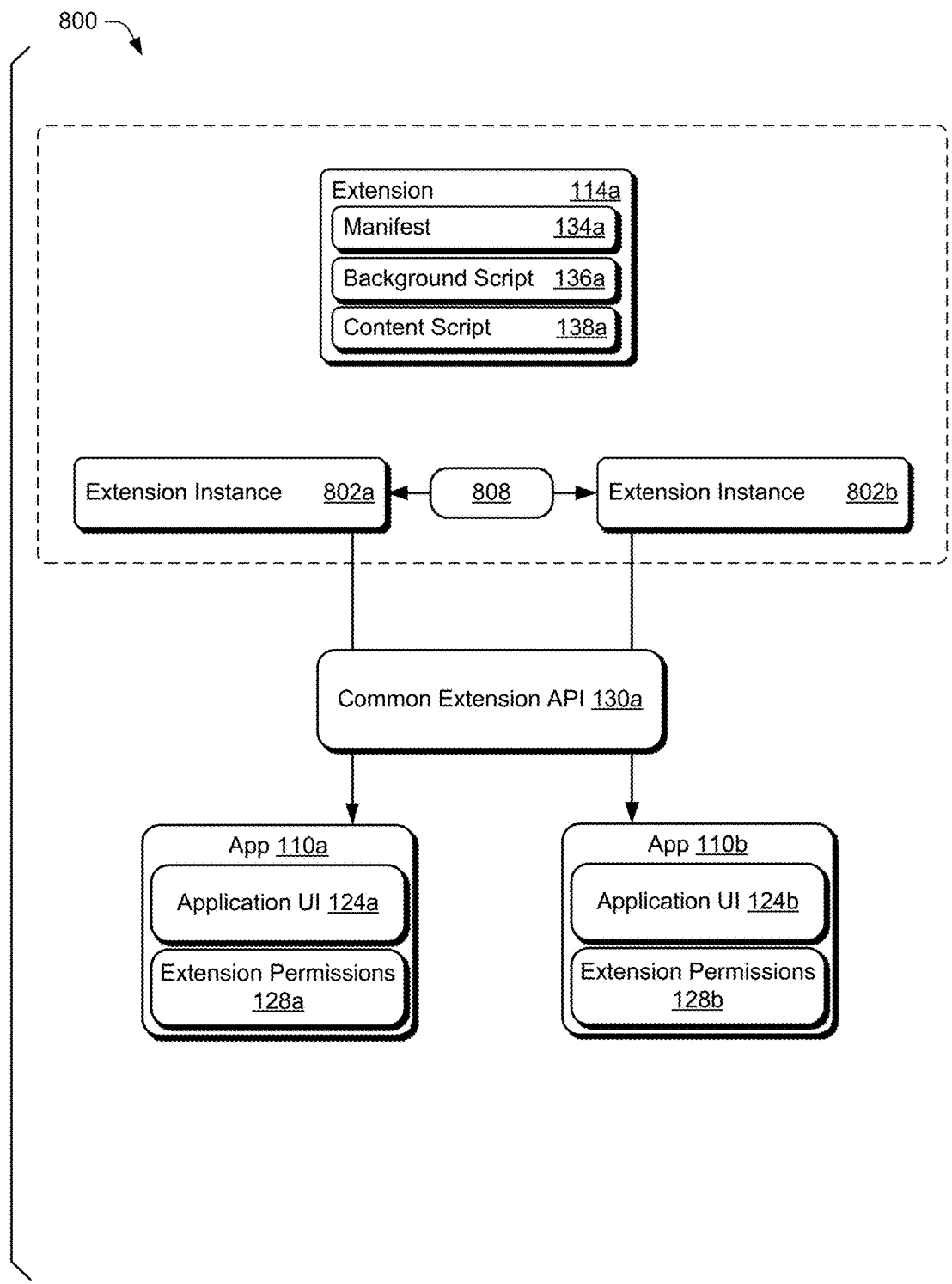
FIG. 8 depicts an example implementation scenario for enabling communication among instances of an extension in accordance with one or more embodiments.

FIG. 8 depicts an example implementation scenario 800 for enabling communication among instances of an extension in accordance with one or more implementations. In at least some implementations, the scenario 800 represents an extension and/or variation of the implementation scenarios described above.

The scenario 800 includes the extension 114a with the manifest 134a, the background script 136a, and the content script 138a. According to various implementations, the extension 114a represents an instance of the extensions 114 introduced above. Further illustrated is an extensions instance 802a and an extension instance 802b, which represent different running instances of the extension 114a.

In the scenario 800, the extension instance 802a engages in an interaction 804 with the application 110a via the common extension API 130a, and the extension instance 802b engages in an interaction 806 with the application 110b via the common extension API 130a. Examples aspects and attributes of the interactions 804, 806 are detailed above with regard to the example extension interactions.

Further to the scenario 800, the extension instances 802a, 802b engage in a messaging interaction 808. Generally, the messaging interaction 808 represents an exchange of data between the extension instances 802a, 802b. For instance, the extension instance 802a communicates state data for the application 110a to the extension instance 802b via the messaging interaction 808. Accordingly, the extension instance 802b may take an action based on the state data for the application 110a. The extension 802b, for example, reconfigures and/or customizes the application 110b based on the state data, such as by visually reconfiguring the application UI 124b based on the state data.

Alternatively or additionally, the extension instance 802b communicates state data for the application 110b to the extension instance 802a. Accordingly, the extension instance 802a may take an action based on the state data for the application 110b. For instance, the extension 802a reconfigures and/or customizes the application 110a based on the state data, such as by visually reconfiguring the application UI 124a based on the state data. Thus, extensions may take various actions based on data received from other extensions and pertaining to other applications.

In at least some implementations, the messaging interaction 808 is performed via execution of the background script 136 and/or the content script 138 for the respective extension instances 802a, 802b.

These examples of information exchanged among the extension instances 802a, 802b are presented for purpose of example only, and it is to be appreciated that a wide variety of different types of information may be exchanged between extensions and/or extension instances.

Accordingly, implementations for extension interaction with applications enable data exchange among different instances of an extension, such as between different instances of an extension that each individually associated with different respective applications. Thus, an instance of an extension may react to events and changes in state for an application with which the instance of the extension does not directly interact. Further, state information may be propagated among multiple different instances of an extension that are each associated and/or interacting with different respective applications.

Having discussed some example implementation scenarios for extension interaction with applications, consider now some example procedures in accordance with one or more implementations.

Example Procedures

This section describes some example procedures for extension interaction with applications in accordance with one or more implementations. The procedures described herein may be used separately or in combination with each other, in whole or in part. These procedures are shown as sets of operations (or acts) performed, such as through one or more entities or modules, and are not necessarily limited to the order shown for performing the operation. The example procedures may be employed in the environment 100 of FIG. 1, the system 1300 of FIG. 13, and/or any other suitable environment. According to one or more implementations, the procedures describe example ways for performing various aspects of the example implementation scenarios described herein. In at least some implementations, steps described for the various procedures are implemented automatically and independent of user interaction.

Figure 9:
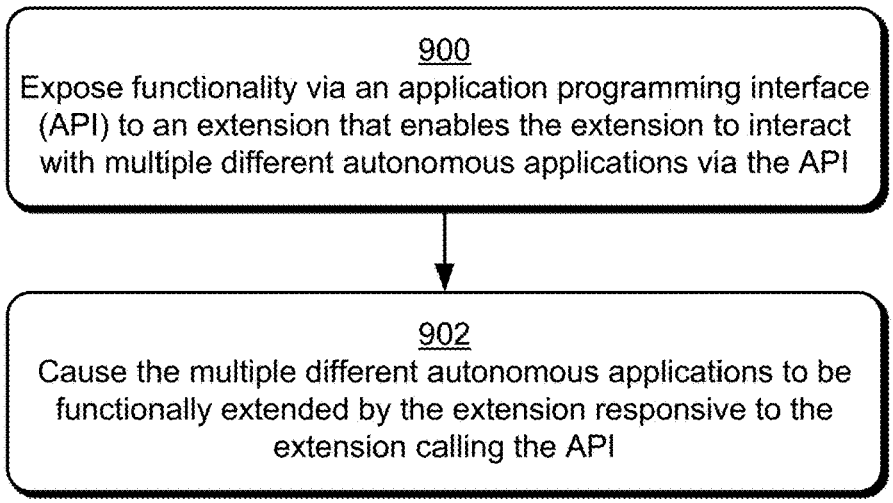
FIG. 9 is a flow diagram that describes steps in a method for exposing an application programming interface for interactions between extensions and applications in accordance with one or more embodiments.

FIG. 9 is a flow diagram that describes steps in a method in accordance with one or more embodiments. The method, for instance, describes an example procedure for exposing an API for interactions between extensions and applications in accordance with one or more embodiments.

Step 900 exposes functionality via an application programming interface (API) to an extension that enables the extension to interact with multiple different autonomous applications via the API. For instance, the operating system 108 and/or the extension platform module 112 expose the common extension APIs 130 to enable the extensions 114 to interact with the applications 110.

Step 902 causes the multiple different autonomous applications to be functionally extended by the extension responsive to the extension calling the API. An extension 114, for instance, calls a common extension API 130 to cause several of the applications 110 to be functionally extended.

According to various implementations, causing applications to be functionally extended can be implemented in various ways. For instance, a common extension behavior is applied across the applications, such as a common added functionality, a common GUI reconfiguration for GUIs of the applications, a common application customization, and so forth.

As another example, causing the applications to be functionally extended includes causing a common entry point for invoking the extension to be provided across the applications. The common entry point may be implemented in various ways for invoking the extension, such as an extension icon (e.g., the extension icon 402) that is presented in a common region across GUIs for the applications, a touch and/or touchless gesture, a key combination on a keyboard, a voice command, and so forth.

According to various implementations, parameters for interaction by the extension with the multiple different applications are specified by extension permissions for applications. As referenced above, individual applications may have different extension permissions that specify allowed and/or disallowed extension interactions and extension behaviors.

Figure 10:
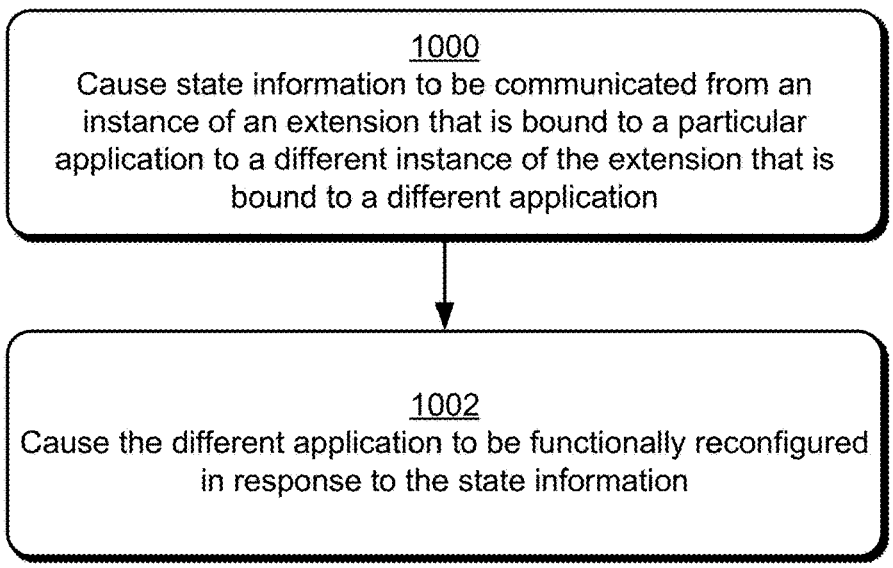
FIG. 10 is a flow diagram that describes steps in a method for enabling communication between different instances of an application in accordance with one or more embodiments.

FIG. 10 is a flow diagram that describes steps in a method in accordance with one or more embodiments. The method, for instance, describes an example procedure for enabling communication between different instances of an application in accordance with one or more embodiments.

Step 1000 causes state information to be communicated from an instance of an extension that is bound to a particular application to a different instance of the extension that is bound to a different application. The different instances of the extension, for example, are interacting with different respective autonomous applications, such as described above with reference to FIG. 8. Thus, an instance of an extension is bound to an application by virtue of its interaction with the application.

According to various implementations, the state information represents different types of information, such as a current state of an application, and indication of a change in an application state, an indication of an occurrence of an application-related event, an indication of user input and/or interaction with an application, and so forth.

Step 1002 causes the different application to be functionally reconfigured in response to the state information. The different instance of the extension, for example, performs one or more actions in relation to the different application to cause the different application to be functionally reconfigured based on the state information. For instance, a functionality is added to the different application, a GUI for the different application is visually reconfigured, a customization is applied to the different application, and so forth.

Figure 11:
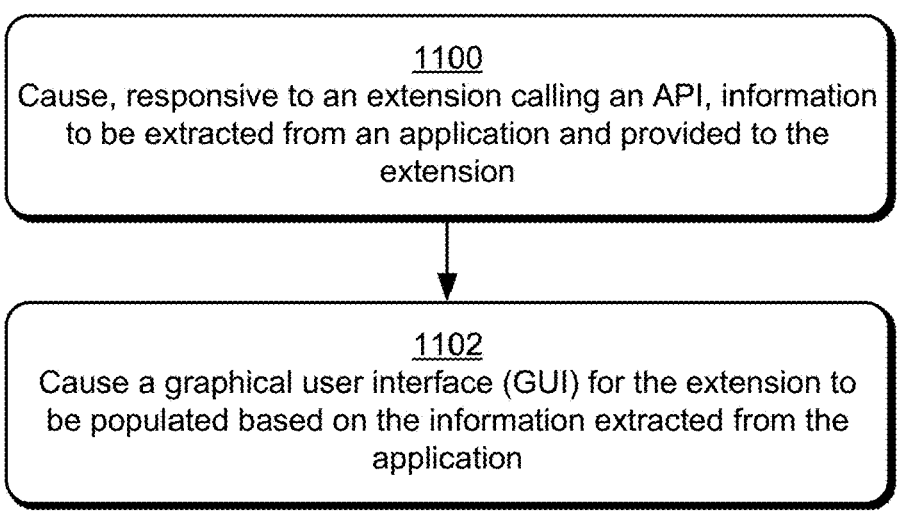
FIG. 11 is a flow diagram that describes steps in a method for interaction between an extension and an application in accordance with one or more embodiments.

FIG. 11 is a flow diagram that describes steps in a method in accordance with one or more embodiments. The method, for instance, describes an example procedure for interaction between an extension and an application in accordance with one or more embodiments. For example, the method describes an example procedure for performing the implementation scenario 700 described above.

Step 1100 causes, responsive to an extension calling an API, information to be extracted from an application and provided to the extension. An extension 114, for instance, calls a common extension API 130, which causes information to be extracted from an application 110 and provided to the extension 114. Various types of information may be extracted, such as application state information, information displayed on a GUI of the application (e.g., text, graphics, media content, and so on), user interaction information, and so forth.

Step 1102 causes a graphical user interface (GUI) for the extension to be populated based on the information extracted from the application. For instance, the GUI for the extension is populated with the information itself. As another example, the information is used to perform a search (e.g., a web search), and results of the search are populated to the GUI for the extension. As another example, the information comprises text that is translated into a different language, and the translation is populated to the GUI for the extension. As a further example, the information comprises media content (e.g., a picture, a graphical element, a video, audio content, and so forth) that is populated to the GUI for the extension such that the media content can be viewed, shared, edited, and so forth via the GUI.

Figure 12:
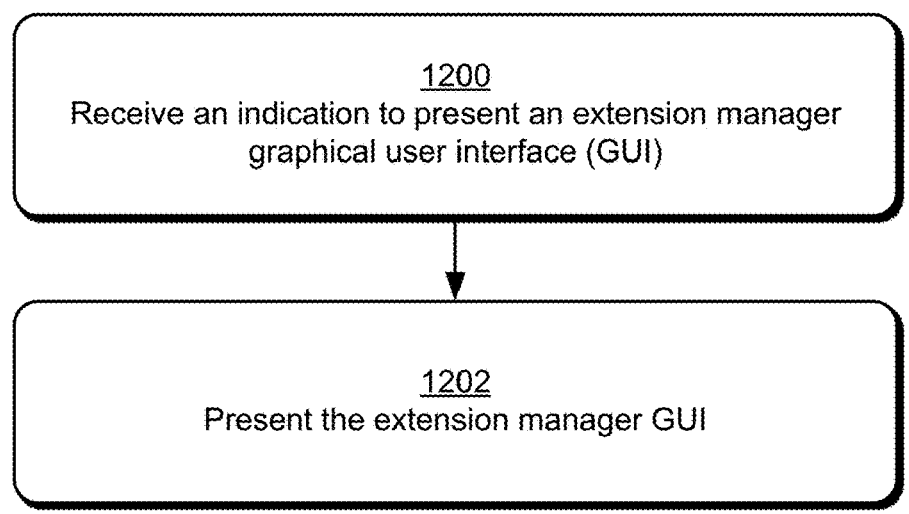
FIG. 12 is a flow diagram that describes steps in a method for presenting an extension manager graphical user interface in accordance with one or more embodiments.

FIG. 12 is a flow diagram that describes steps in a method in accordance with one or more embodiments. The method, for instance, describes an example procedure for presenting an extension manager graphical user interface in accordance with one or more embodiments. For example, the method describes an example procedure for performing the implementation scenario 600 described above.

Step 1200 receives an indication to present an extension manager graphical user interface (GUI). The extension manager interface 132, for instance, receives user input requesting that an extension manager GUI be presented.

Step 1202 presents the extension manager GUI. For example, the extension manager interface 132 causes the extension manager GUI 600 to be displayed. As referenced above, the extension manager GUI 600 enables various extension-related tasks to be performed, such as disabling extensions, enabling extensions, customizing extensions, and so forth. Further, the extension manager GUI 600 enables additional extensions to be obtained. For instance, the extension manager GUI 600 includes an interface to the extension store 140.

Having discussed some example procedures for extension interaction with applications, consider now a discussion of an example system and device for performing various aspects of the procedures and implementation scenarios for extension interaction with applications in accordance with one or more implementations.

Example System and Device

Figure 13:
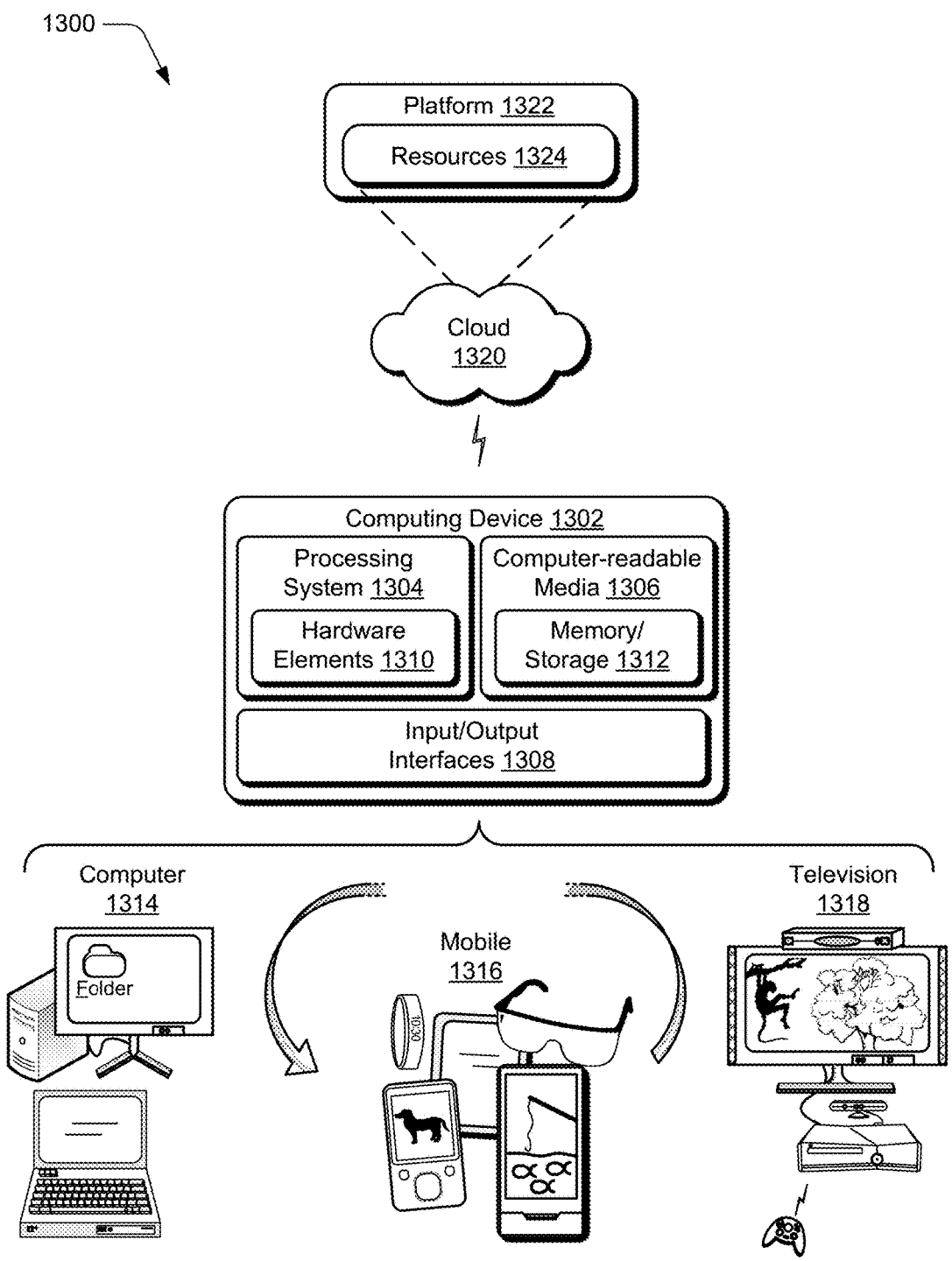
FIG. 13 illustrates an example system and computing device as described with reference to FIG. 1, which are configured to implement embodiments of techniques described herein.

FIG. 13 illustrates an example system generally at 1300 that includes an example computing device 1302 that is representative of one or more computing systems and/or devices that may implement various techniques described herein. For example, the computing device 102 discussed above with reference to FIG. 1 can be embodied as the computing device 1302. The computing device 1302 may be, for example, a server of a service provider, a device associated with the client (e.g., a client device), an on-chip system, and/or any other suitable computing device or computing system.

The example computing device 1302 as illustrated includes a processing system 1304, one or more computer-readable media 1306, and one or more Input/Output (I/O) Interfaces 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1306 is illustrated as including memory/storage 1312. The memory/storage 1312 represents memory/storage capacity associated with one or more computer-readable media. The memory/storage 1312 may include volatile media (such as random access memory (RAM)) and/or nonvolatile media (such as read only memory (ROM), Flash memory, optical disks, magnetic disks, and so forth). The memory/storage 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1310 and computer-readable media 1306 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of modules that are executable by the computing device 1302 as software may be achieved at least partially in hardware, e.g., through use of computer-readable storage media and/or hardware elements 1310 of the processing system. The instructions and/or functions may be executable/operable by one or more articles of manufacture (for example, one or more computing devices 1302 and/or processing systems 1304) to implement techniques, modules, and examples described herein.

As further illustrated in FIG. 13, the example system 1300 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1300, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1302 may assume a variety of different configurations, such as for computer 1314, mobile 1316, and television 1318 uses. Each of these configurations includes devices that may have generally different constructs and capabilities, and thus the computing device 1302 may be configured according to one or more of the different device classes. For instance, the computing device 1302 may be implemented as the computer 1314 class of a device that includes a personal computer, desktop computer, a multi-screen computer, laptop computer, netbook, and so on.

The computing device 1302 may also be implemented as the mobile 1316 class of device that includes mobile devices, such as a mobile phone, portable music player, portable gaming device, a tablet computer, a wearable device, a multi-screen computer, and so on. The computing device 1302 may also be implemented as the television 1318 class of device that includes devices having or connected to generally larger screens in casual viewing environments. These devices include televisions, set-top boxes, gaming consoles, and so on.

The techniques described herein may be supported by these various configurations of the computing device 1302 and are not limited to the specific examples of the techniques described herein. For example, functionalities discussed with reference to the computing device 102 may be implemented all or in part through use of a distributed system, such as over a "cloud" 1320 via a platform 1322 as described below.

The cloud 1320 includes and/or is representative of a platform 1322 for resources 1324. The platform 1322 abstracts underlying functionality of hardware (e.g., servers) and software resources of the cloud 1320. The resources 1324 may include applications and/or data that can be utilized while computer processing is executed on servers that are remote from the computing device 1302. Resources 1324 can also include services provided over the Internet and/or through a subscriber network, such as a cellular or Wi-Fi network.

The platform 1322 may abstract resources and functions to connect the computing device 1302 with other computing devices. The platform 1322 may also serve to abstract scaling of resources to provide a corresponding level of scale to encountered demand for the resources 1324 that are implemented via the platform 1322. Accordingly, in an interconnected device embodiment, implementation of functionality described herein may be distributed throughout system 1300. For example, the functionality may be implemented in part on the computing device 1302 as well as via the platform 1322 that abstracts the functionality of the cloud 1320.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100 and/or the system 1300.

Implementations discussed herein include:

Example 1

A system comprising: one or more processors; and one or more computer-readable media storing processor-executable instructions that, responsive to execution by the one or more processors, cause the system to perform operations including: exposing functionality via an application programming interface (API) to an extension that enables the extension to interact with multiple different autonomous applications via the API; and responsive to the extension calling the API, causing the multiple different autonomous applications to be functionally extended by the extension.

Example 2

A system as described in example 1, wherein said causing the multiple different autonomous applications to be functionally extended comprises causing a common behavior to be applied across the multiple different autonomous applications.

Example 3

A system as described in one or more of examples 1 or 2, wherein said causing the multiple different autonomous applications to be functionally extended comprises causing a common entry point for invoking the extension to be provided across the multiple different autonomous applications.

Example 4

A system as described in one or more of examples 1-3, wherein said causing the multiple different autonomous applications to be functionally extended comprises causing a common entry point for invoking the extension to be provided across the multiple different autonomous applications, the common entry point comprising an extension icon that is presented in a common region across graphical user interfaces (GUIs) for the multiple different autonomous applications.

Example 5

A system as described in one or more of examples 1-4, wherein the extension includes a content script comprising logic that is executable to cause the multiple different autonomous applications to be functionally extended.

Example 6

A system as described in one or more of examples 1-5, wherein one or more parameters for interaction by the extension with a particular application of the multiple different autonomous applications are specified by one or more extension permissions for the particular application.

Example 7

A system as described in one or more of examples 1-6, wherein one or more parameters for interaction by the extension with a particular application of the multiple different autonomous applications are specified by one or more extension permissions for the particular application, the one or more extension permissions specifying an interaction behavior that is not permitted between the extension and the particular application.

Example 8

A system as described in one or more of examples 1-7, wherein said causing the multiple different autonomous applications to be functionally extended by the extension is implemented via different instances of the extension that are bound to individual applications of the multiple different autonomous applications, and wherein the operations further comprise causing state information to be communicated between at least some of the different instances of the extension.

Example 9

A system as described in one or more of examples 1-8, wherein said causing the multiple different autonomous applications to be functionally extended by the extension is implemented via different instances of the extension that are bound to individual applications of the multiple different autonomous applications, and wherein the operations further comprise: causing state information to be communicated between at least some of the different instances of the extension; and causing the different instance of the extension to perform an action relating to a respective application of the multiple autonomous applications based on the state information.

Example 10

A system as described in one or more of examples 1-9, wherein the operations further include: responsive to a different extension calling the API, causing information to be extracted from a particular application of the multiple different autonomous applications and provided to the different extension; and causing a graphical user interface (GUI) for the different extension to be populated based on the information extracted from the particular application, the GUI for the different extension being presented separately from a GUI for the particular application.

Example 11

A system as described in one or more of examples 1-10, wherein the operations further include presenting an extension manager graphical user interface (GUI) that includes functionality for performing actions including: one or more of enabling or disabling the extension; customizing the extension; and obtaining one or more other extensions.

Example 12

A computer-implemented method comprising: exposing functionality via an application programming interface (API) to an extension that enables the extension to interact with multiple different autonomous applications via the API; and responsive to the extension calling the API, causing the multiple different autonomous applications to be functionally extended by the extension such that a common entry point for invoking the extension is provided across the multiple different autonomous applications.

Example 13

A computer-implemented method as described in example 12, wherein said exposing further comprises exposing the functionality via the API to multiple different extensions to enable the multiple different extensions to interact with the multiple different autonomous applications via the API.

Example 14

A computer-implemented method as described in one or more of examples 12 or 13, wherein the common entry point comprises an extension icon that is presented in a common region across graphical user interfaces (GUIs) for the multiple different autonomous applications.

Example 15

A computer-implemented method as described in one or more of examples 12-14, wherein invoking the extension in two or more applications of the multiple different autonomous applications causes a common extension behavior across the two or more applications.

Example 16

A computer-implemented method as described in one or more of examples 12-15, wherein invoking the extension in a particular application of the multiple different autonomous applications causes information to be extracted from the particular application and provided to the extension, and a graphical user interface (GUI) for the extension to be populated based on the information.

Example 17

A computer-implemented method as described in one or more of examples 12-16, further comprising presenting an extension manager interface that includes functionality for performing actions including: one or more of enabling or disabling the extension; and obtaining one or more other extensions.

Example 18

A computer-implemented method as described in one or more of examples 12-17, wherein parameters for interaction by the extension with a particular application of the multiple different autonomous applications are specified by one or more extension permissions for the particular application, the one or more extension permissions specifying an interaction behavior that is not permitted between the extension and the particular application.

Example 19

A computer-implemented method comprising: causing state information to be communicated from an instance of an extension that is bound to a particular application to a different instance of the extension that is bound to a different application; and causing the different application to be functionally reconfigured in response to the state information.

Example 20

A computer-implemented method as described in example 19, wherein the state information comprises an indication of a change in a state of the particular application.

CONCLUSION

Although embodiments of techniques and apparatuses enabling extension interaction with applications have been described in language specific to features and/or methods, it is to be understood that the subject of the appended claims is not necessarily limited to the specific features or methods described. Rather, the specific features and methods are disclosed as example implementations enabling extension interaction with applications.

What is claimed is:

1. A system comprising:
 at least one processor; and
 at least one computer-readable storage media storing instructions that are executable by the at least one processor to perform operations including:
 receiving an indication to present an extension manager graphical user interface (GUI); and
 presenting the extension manager GUI configured to:
 display state information for one or more extensions, the one or more extensions representing separate functionality from one or more applications and the one or more extensions configured to perform one or more of extending, modifying, customizing, or supplementing functionality of the one or more applications; and
 receive user input to perform one or more of configuring an extension of the one or more extensions, or obtaining an extension.

2. A system as recited in claim 1, wherein the extension manager GUI is configured to receive the user input to enable the extension to be obtained from a remote resource.

3. A system as recited in claim 1, wherein the extension manager GUI is configured to receive the user input to enable presentation of an extension store that includes functionality for one or more of searching for or obtaining an extension not presently installed on the system.

4. A system as recited in claim 1, wherein the extension manager GUI is further configured to display one or more recommended extensions based on one or more of popularity, a user preference, a user behavior, or extension rating on an extension store.

5. A system as recited in claim 1, wherein said configuring the extension includes enabling or disabling the extension.

6. A system as recited in claim 1, wherein responsive to receiving the user input to obtain the extension, the operations further include:
 presenting an extension store GUI configured to:
 display available extensions not presently installed on the system; and
 receive a selection of one of the available extensions for download.

7. A system as recited in claim 1, wherein said receiving the indication to present the extension manager GUI includes receiving a selection of an extension manager icon.

8. A system as recited in claim 1, wherein extension information is extracted from the one or more applications, and the state information is populated based on the extracted extension information.

9. A system as recited in claim 1, wherein the one or more extensions perform said one or more of extending, modifying, customizing, or supplementing functionality of an application which is currently in focus on the system.

10. A computer-implemented method comprising:
 receiving an indication to present an extension manager graphical user interface (GUI) on a computing device; and
 presenting the extension manager GUI configured to:
 display state information for one or more extensions, the one or more extensions representing separate functionality from one or more applications and the one or more extensions configured to perform one or more of extending, modifying, customizing, or supplementing functionality of the one or more applications; and
 receive user input to perform one or more of configuring an extension of the one or more extensions, or obtaining an extension.

11. A computer-implemented method as described in claim 10, wherein the extension manager GUI is configured to receive the user input to enable presentation of an extension store that includes functionality for one or more of searching for or obtaining an extension not presently installed on the computing device.

12. A computer-implemented method as described in claim 10, wherein the extension manager GUI is further configured to display one or more recommended extensions based on one or more of popularity, a user preference, a user behavior, or a rating on an extension store.

13. A computer-implemented method as described in claim 10, wherein responsive to receiving the user input to obtain the extension, method further includes:
 presenting an extension store GUI configured to:
 display available extensions not presently installed on the computing device; and
 receive a selection of one of the available extensions for download.

14. A computer-implemented method as described in claim 10, wherein the one or more extensions perform said one or more of extending, modifying, customizing, or supplementing functionality of an application which is currently in focus on the computing device.

15. A computer-implemented method as described in claim 10, wherein said receiving the indication to present the extension manager GUI includes receiving a selection of an extension manager icon.

16. A computer-implemented method comprising:
extracting extension information from one or more applications;
responsive to receiving an indication to present an extension manager graphical user interface (GUI), presenting the extension manager GUI including:
a configure extensions region displaying state information for one or more extensions based on the extracted extension information, the one or more extensions representing functionality separate from the one or more applications for performing one or more of extending, modifying, customizing, or supplementing functionality of the one or more applications; and
a get extensions region displaying one or more recommended extensions, the one or more recommended extensions representing extensions available from an extension store that are not presently available to the one or more applications; and
receiving user input to perform one or more of configuring an extension of the one or more extensions, or obtaining an extension of the one or more recommended extensions.

17. A computer-implemented method as described in claim 16, wherein the one or more recommended extensions are displayed based on one or more of popularity on the extension store, a user preference, a user behavior, or a rating on the extension store.

18. A computer-implemented method as described in claim 16, wherein said configuring the extension includes enabling or disabling the extension.

19. A computer-implemented method as described in claim 16, wherein the get extensions region further includes a store control selectable to navigate to the extension store.

20. A computer-implemented method as described in claim 16, wherein the one or more extensions perform said one or more of extending, modifying, customizing, or supplementing functionality of the application which is currently in focus.

* * * * *